US010180336B2

(12) United States Patent
Bremerkamp et al.

(10) Patent No.: US 10,180,336 B2
(45) Date of Patent: Jan. 15, 2019

(54) SUPPORT STRUCTURE FOR ROTARY SENSOR

(71) Applicant: Joy MM Delaware, Inc., Wilmington, DE (US)

(72) Inventors: Stephen Bremerkamp, Franklin, PA (US); Joshua Lutz, Mercer, PA (US); Ryan Perry, Venus, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 159 days.

(21) Appl. No.: 15/406,108

(22) Filed: Jan. 13, 2017

(65) Prior Publication Data

US 2017/0205252 A1    Jul. 20, 2017

Related U.S. Application Data

(60) Provisional application No. 62/279,427, filed on Jan. 15, 2016.

(51) Int. Cl.
*G01D 11/24* (2006.01)
*G01D 5/00* (2006.01)
(Continued)

(52) U.S. Cl.
CPC ........... *G01D 5/3473* (2013.01); *E21C 27/38* (2013.01); *E21C 29/02* (2013.01); *E21C 35/00* (2013.01);
(Continued)

(58) Field of Classification Search
CPC .... G01D 11/24; G01D 11/245; G01D 5/3473; G01D 5/34738
(Continued)

(56) References Cited

U.S. PATENT DOCUMENTS 3,282,627 A    11/1966  Arndt
4,006,935 A *  2/1977  Gapper ................... E21C 25/06
                                                                299/1.6
(Continued)

FOREIGN PATENT DOCUMENTS

CN    108166976 A  *  6/2018
WO    2010000520 A2    1/2010
(Continued)

OTHER PUBLICATIONS

International Search Report and Written Opinion for Application No. PCT/US17/13458 dated Apr. 10, 2017 (29 pages).

*Primary Examiner* — Sunil Singh
(74) *Attorney, Agent, or Firm* — Michael Best & Friedrich LLP

(57) ABSTRACT

A rotary sensor includes a rotor and a housing. A support structure includes a shaft, a housing portion, a first member, and a second member. A first end of the shaft is coupled to the rotor, and the shaft is supported for rotation about a shaft axis. The housing portion includes a first bore extending along a first axis, and a second bore extending along a second axis oriented at a non-zero angle relative to the first axis. The first member is received in the first bore and is movable relative to the housing portion in a direction parallel to the first axis. The first member is coupled to the second end of the shaft. The second member is received in the second bore. At least one of the housing portion and the second member is movable relative to the other of the housing portion and the second member in a direction parallel to the second axis.

21 Claims, 13 Drawing Sheets

(51) Int. Cl.
  *G01D 5/347* (2006.01)
  *E21C 27/38* (2006.01)
  *E21C 35/00* (2006.01)
  *G01D 5/14* (2006.01)
  *G01D 5/24* (2006.01)
  *E21C 29/02* (2006.01)

(52) U.S. Cl.
  CPC ................ *G01D 5/14* (2013.01); *G01D 5/24* (2013.01); *G01D 11/24* (2013.01); *G01D 5/34738* (2013.01); *G01D 11/245* (2013.01)

(58) Field of Classification Search
  USPC .................................................. 299/1.05–1.9
  See application file for complete search history.

(56) References Cited

U.S. PATENT DOCUMENTS

| | | |
|---|---|---|
| 4,412,700 A | 11/1983 | Zitz et al. |
| 4,952,000 A | 8/1990 | Lipinski et al. |
| 5,667,279 A | 9/1997 | Christopher et al. |
| 5,967,616 A | 10/1999 | Offutt et al. |
| 6,246,232 B1 | 6/2001 | Okumura |
| 2004/0252032 A1 | 12/2004 | Netzer |
| 2005/0173639 A1 | 8/2005 | Frederick et al. |
| 2006/0250292 A1 | 11/2006 | Yamagata |
| 2013/0033086 A1 | 2/2013 | Jokonya |
| 2014/0265528 A1* | 9/2014 | O'Neill .................... E21C 1/00 299/42 |

FOREIGN PATENT DOCUMENTS

| | | |
|---|---|---|
| WO | 2010116206 A1 | 10/2010 |
| WO | WO 2012/019474 A1 * | 2/2012 |

\* cited by examiner

US 10,180,336 B2

SUPPORT STRUCTURE FOR ROTARY SENSOR

CROSS-REFERENCE TO RELATED APPLICATION

This application claims the benefit of prior-filed, U.S. Provisional Patent Application No. 62/279,427, filed Jan. 15, 2016, the entire contents of which are hereby incorporated by reference.

BACKGROUND

The present disclosure relates to sensors, and particularly to a support structure for a rotary sensor.

Conventional longwall shearers include a frame and a pair of cutting assemblies coupled to ends of the frame. Each cutting assembly includes an arm pivotably coupled to the frame and a cutting drum for engaging a mine wall. The cutting drum is supported on the arm. As the frame traverses a mine face, the cutting drums cut material from the mine face. In some embodiments, the material is deposited on a conveyor and carried away from the mine face. The arms may be pivoted to adjust the position of each cutting drum.

SUMMARY

In one aspect, a support structure is provided for a rotary sensor that includes a rotor and a housing. The support structure includes a shaft, a housing portion, a first member, and a second member. The shaft includes a first end, a second end, and a shaft axis extending therebetween. The first end is configured to be coupled to the rotor, and the shaft is supported for rotation about the shaft axis. The housing portion includes a first bore and a second bore. The first bore extends along a first axis, and the second bore extends along a second axis oriented at a non-zero angle relative to the first axis. The first member is at least partially positioned in the first bore and is movable relative to the housing portion in a direction parallel to the first axis. The first member is coupled to the second end of the shaft. The second member is at least partially positioned in the second bore. At least one of the housing portion and the second member is movable relative to the other of the housing portion and the second member in a direction parallel to the second axis.

In another aspect, a rotary sensor assembly includes a sensor, a shaft, a support housing portion, and a member. The sensor includes a sensor housing and a rotor. The sensor housing has an interior chamber. The rotor is positioned within the interior chamber and is rotatable relative to the sensor housing about a rotor axis. The sensor detects the angular position of the rotor relative to the sensor housing about the rotor axis. The shaft includes a first end and a second end. The first end is coupled to the rotor, and the shaft is supported for rotation relative to the sensor housing about the rotor axis. The support housing portion includes a bore extending along a support axis. The member is at least partially positioned in the bore and is coupled to the second end of the shaft. The member is movable relative to the support housing portion in a direction parallel to the axis in response to deflection of the second end of the shaft relative to the rotor axis.

In yet another aspect, a mining machine includes a chassis, at least one cutting assembly, and a sensor assembly, a shaft, a support housing portion, a first member, and a second member. The chassis includes a drive mechanism for moving the chassis relative to a mine surface. The at least one cutting assembly includes an arm and a cutting mechanism. The arm is pivotably coupled to the chassis and pivotable about an arm axis, and the cutting mechanism is supported for rotation on the arm and includes a plurality of cutting bits for engaging a mine face. The sensor assembly is coupled to one of the chassis and the arm, and includes a sensor housing and a rotor. The sensor housing has an interior chamber, and the rotor is positioned within the interior chamber and rotatable relative to the sensor housing about a rotor axis. The sensor detects angular displacement of the rotor relative to the sensor housing about the rotor axis when the arm pivots relative to the chassis about the arm axis. The shaft includes a first end and a second end. The first end is coupled to the rotor. The shaft is supported for rotation relative to the sensor housing about the rotor axis. The support housing portion includes a first bore and a second bore. The first bore extends along a first axis, and the second bore extends along a second axis oriented at a non-zero angle relative to the first axis. The first member is at least partially positioned in the first bore. The first member is coupled to the second end of the shaft and is movable relative to the support housing portion in a direction parallel to the first axis in response to deflection of the second end of the shaft away from the rotor axis. The second member is coupled to the other of the chassis and the arm. The second member is at least partially positioned in the second bore. At least one of the support housing portion and the second member is movable relative to the other of the support housing portion and the second member in a direction parallel to the second axis and in response to deflection of the second end of the shaft away from the rotor axis.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
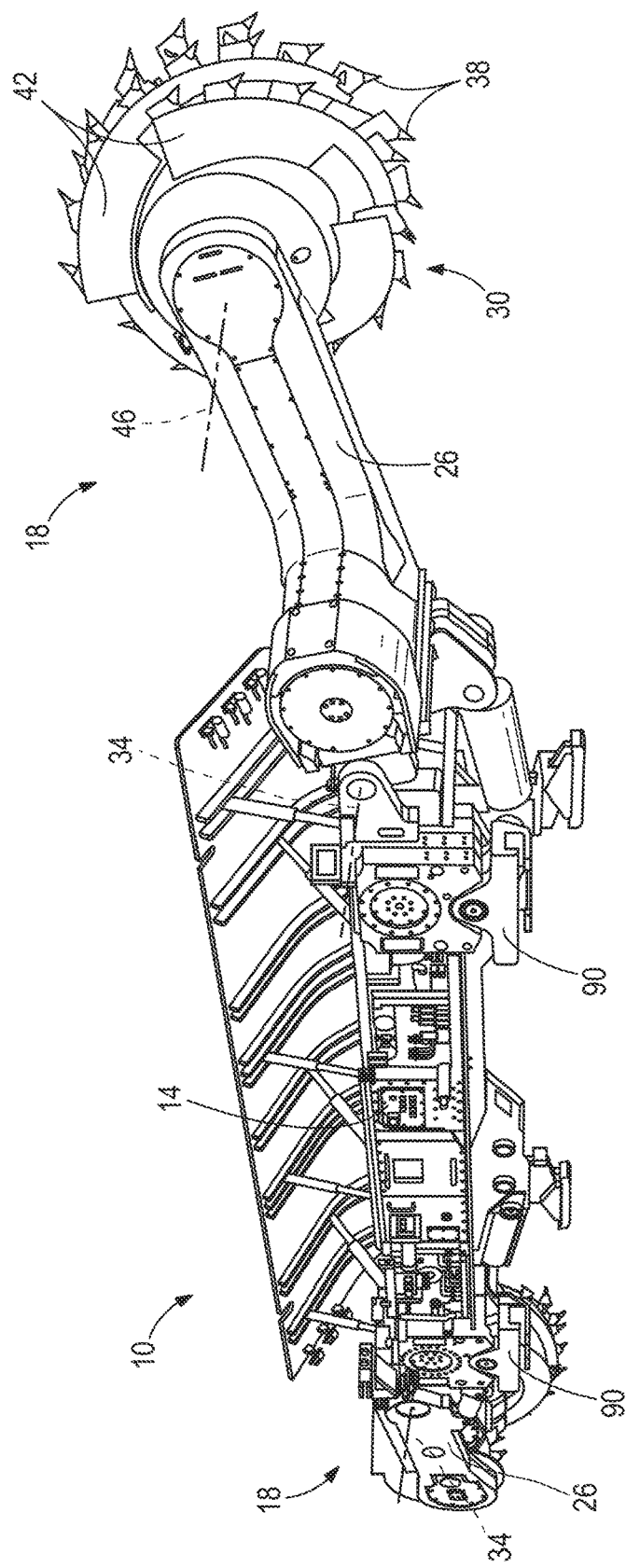
FIG. 1 is a perspective view of a mining machine.

FIG. 1 illustrates a mining machine, such as a longwall shearer 10. In the illustrated embodiment, the shearer 10 includes a chassis or frame 14 and a pair of cutting assemblies 18. Each cutting assembly 18 includes a ranging arm 26 and a cutting drum 30. Each ranging arm 26 is pivotably coupled to an end of the frame 14 and pivots about an arm axis 34. Each ranging arm 26 rotatably supports the associated cutting drum 30. Each cutting drum 30 includes a generally cylindrical body and cutting bits 38. In the illustrated embodiment, vanes 42 extend in a helical manner along an outer surface or periphery of the drum 30, and the cutting bits 38 are positioned along the edges of the vanes 42. The drum 30 is coupled to the ranging arm 26 and is rotatable about a drum axis 46 that is substantially parallel to the arm axis 34 (i.e., generally perpendicular to the ranging arm 26). The mining machine 10 also includes a trapping shoe or guide shoe 90.

Figure 2:
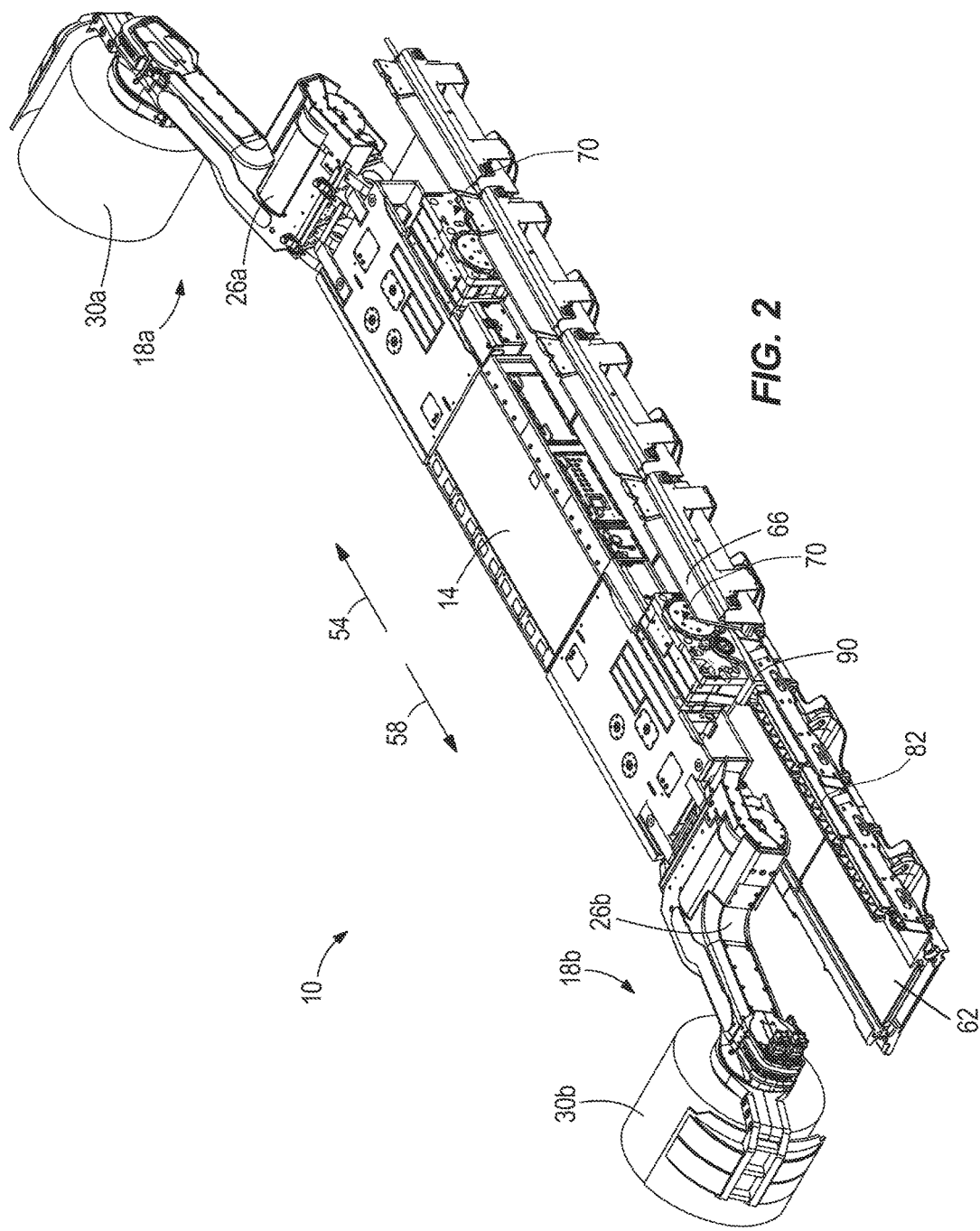
FIG. 2 is a perspective of the mining machine of FIG. 1.

As shown in FIG. 2, the frame 14 is configured to tram or move along a mine face or wall of material to be mined (such as coal—not shown) to be mined in a first direction 54 and a second direction 58. For simplicity, each drum 30 is illustrated as a cylinder in FIG. 2. Each drum 30 engages the mine wall such that the bits 38 (FIG. 1) cut material from the wall. As the cutting drum 30 rotates, the vanes 42 (FIG. 1) carry the cut material from the wall toward a rear end of the drum 30, where the cut material is deposited onto a face conveyor 62. The face conveyor 62 carries the material toward another conveying mechanism such as a gate conveyor (not shown) to be transported out of the mine. In the illustrated embodiment, a spill plate 66 is positioned behind the frame 14 (i.e., away from the wall) to prevent cut material from falling behind the conveyor 62. In addition, roof supports (not shown) may be positioned behind the conveyor 62 and the spill plate 66.

As the frame 14 moves in the first direction 54, a first cutting assembly 18a is in a leading position and a second cutting assembly 18b is in a trailing position. In one embodiment, the leading position is an elevated position in order to cut the material, such as coal, from an upper portion of the mine wall, while the trailing position is a lower position to cut material from a lower portion of the mine wall.

Figure 3:
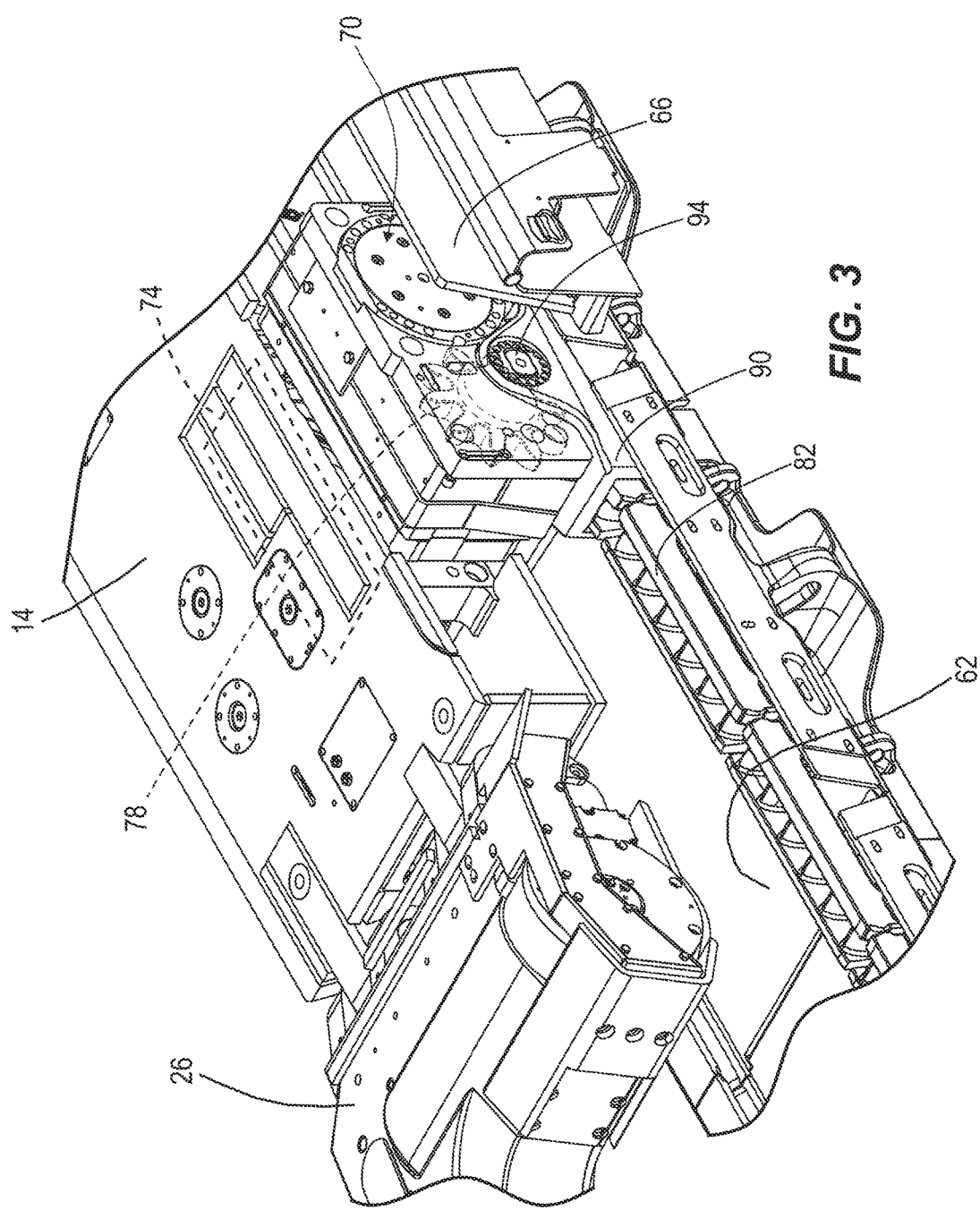
FIG. 3 is an enlarged perspective view of a portion of the mining machine of FIG. 1.
Figure 4:
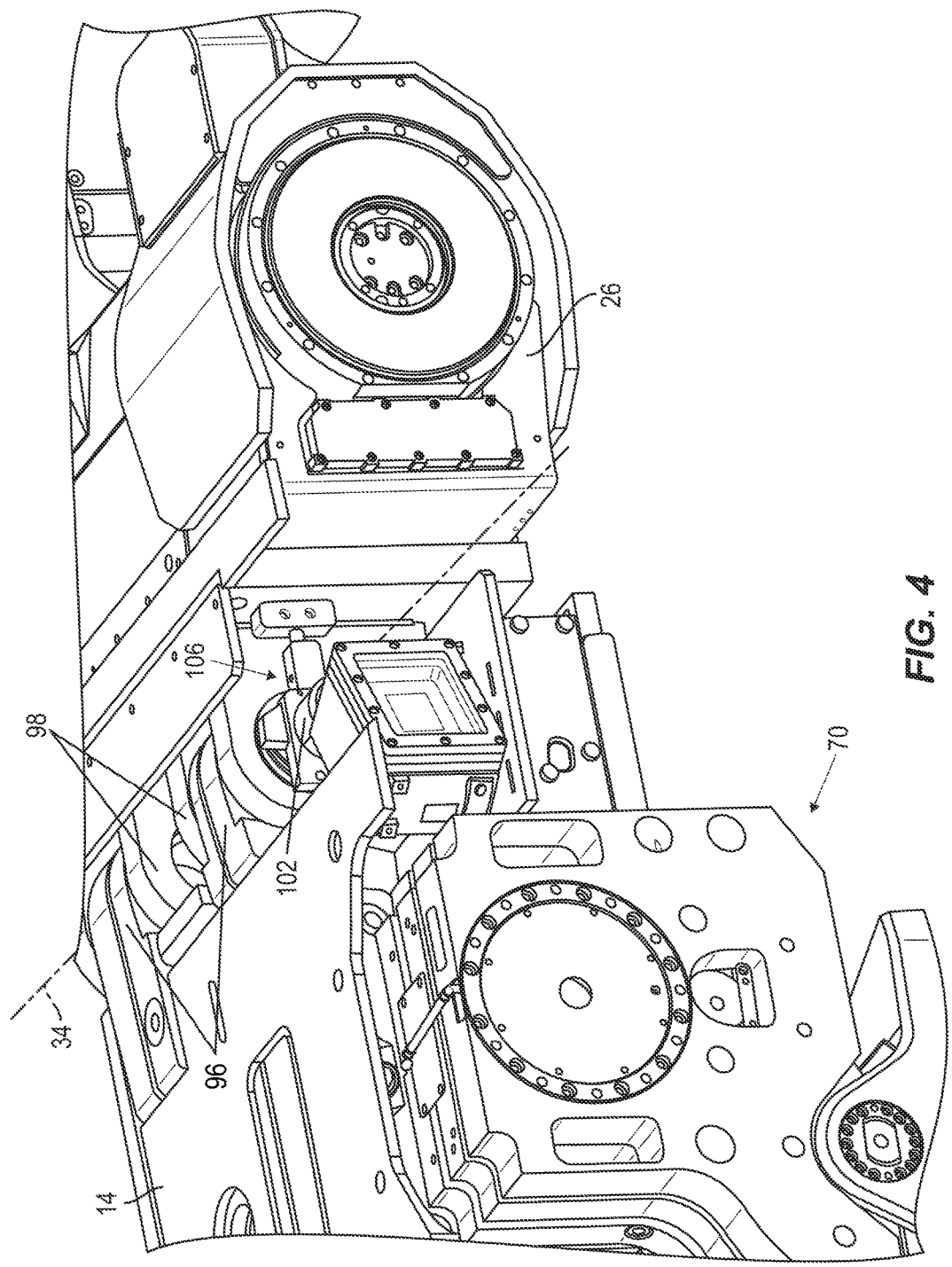
FIG. 4 is an enlarged perspective view of a portion of the mining machine of FIG. 1.
Figure 5:
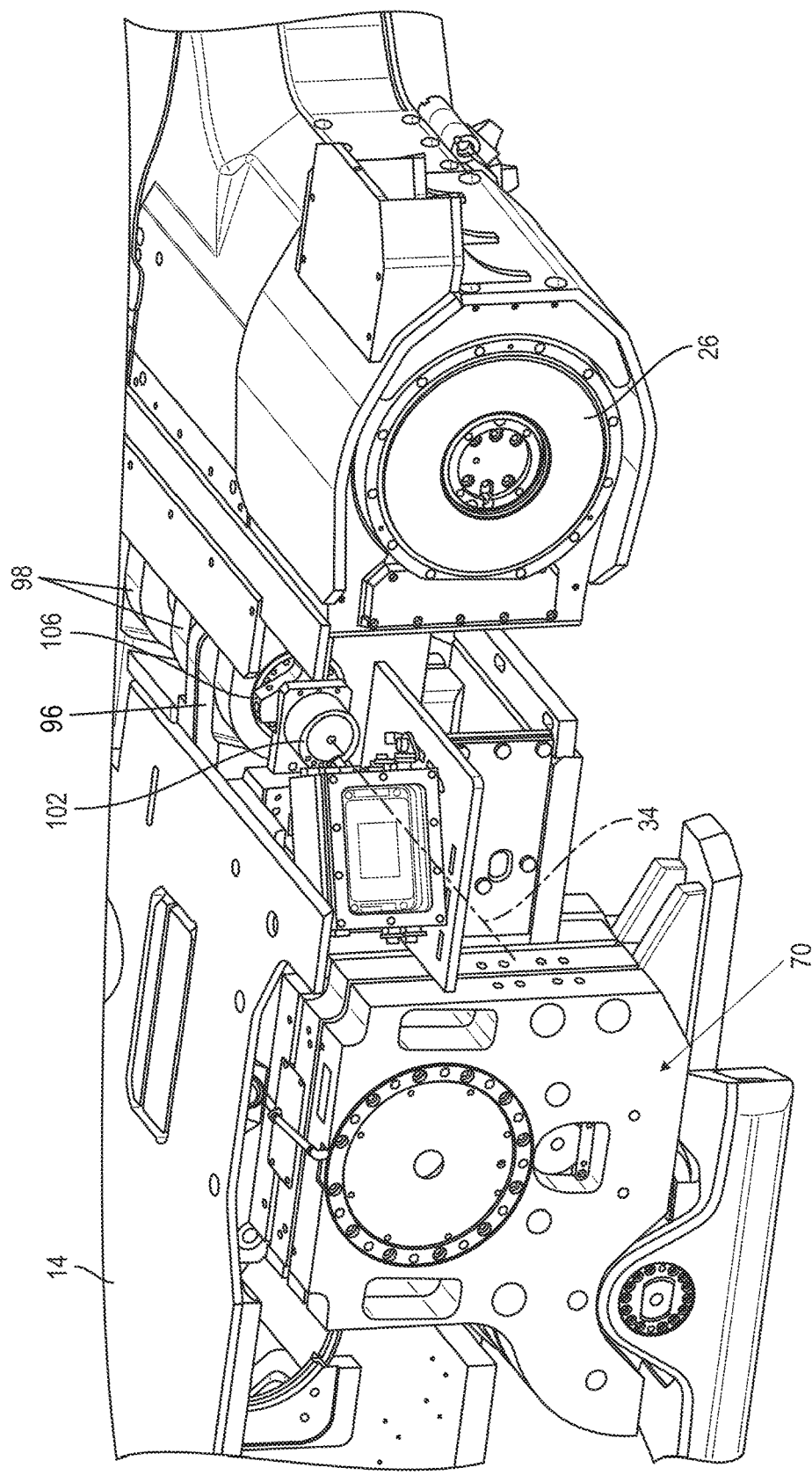
FIG. 5 is another perspective view of the portion of the mining machine shown in FIG. 4.
Figure 6:
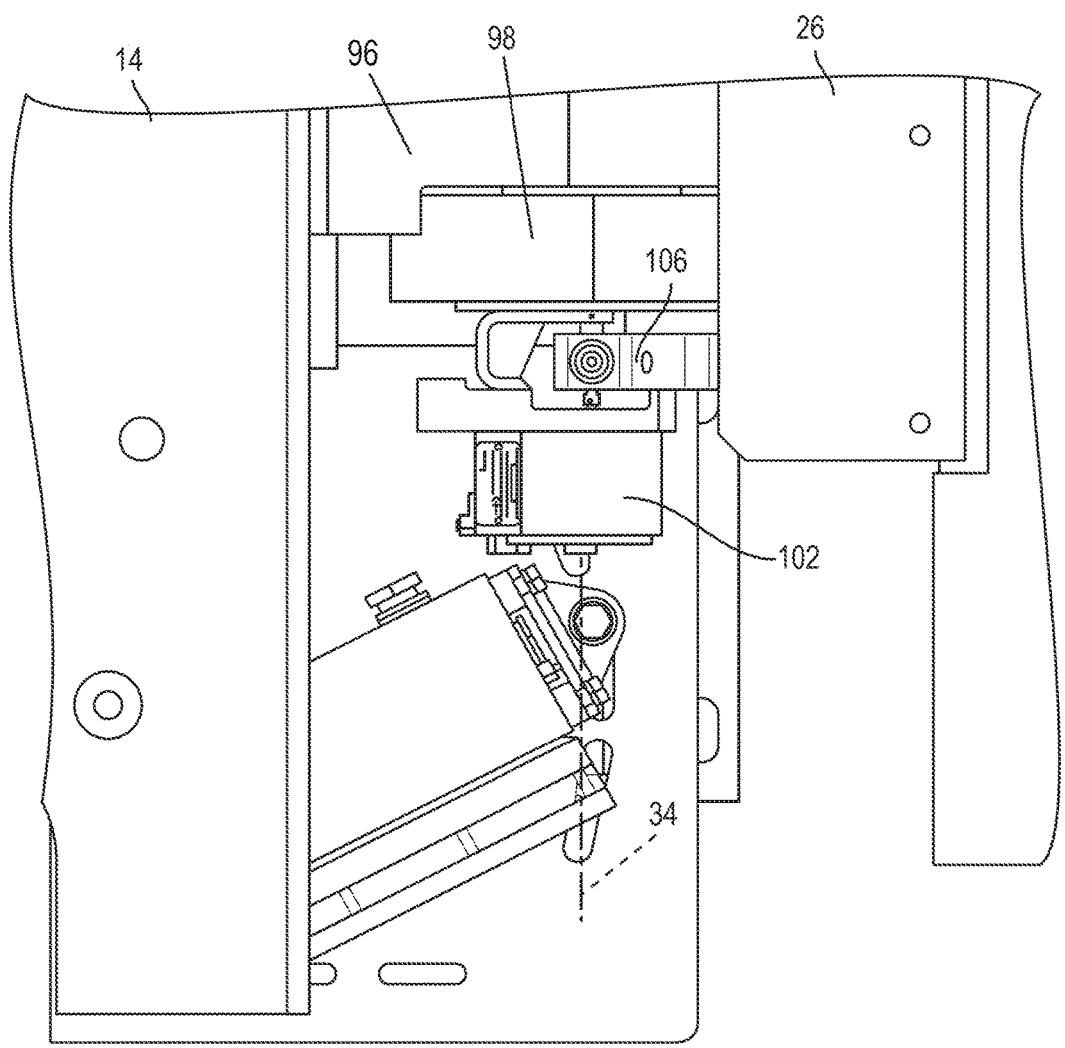
FIG. 6 is a top view of the portion of the mining machine shown in FIG. 4.

Referring now to FIG. 3, the machine 10 includes a drive mechanism 70 for moving the frame 14. The drive mechanism 70 includes a motor 74 driving an output shaft (not shown), which in turn drives a gear or sprocket 78. The sprocket 78 has teeth that engage a rack 82 to form a rack-and-pinion connection, and rotation of the sprocket 78 causes translational movement of the frame 14 relative to the rack 82. In the illustrated embodiment, the rack 82 is coupled to the face conveyor 62 and extends along the mine face. The output shaft may drive the sprocket 78 through a gear train (not shown).

A trapping shoe or guide shoe 90 is pivotably coupled to the frame 14 by a pin 94. The guide shoe 90 is slidably coupled to the rack 82. The sprocket 78 may be supported for rotation about the pin 94, and the teeth of the sprocket 78 extend through the shoe 90 to engage the rack 82. Among other things, the guide shoe 90 guides the movement of the frame 14 relative to the rack 82 along the mine face and maintains alignment and engagement between the sprocket 78 and the rack 82. In the illustrated embodiment, a guide shoe 90 is positioned proximate each end of the frame 14; in other embodiments, the mining machine 10 may include fewer or more guide shoes. Other aspects of the drive mechanism 70 may be similar to the system described in U.S. patent application Ser. No. 15/374,747, filed Dec. 9, 2016, the entire contents of which are incorporated by reference herein.

FIGS. 4-7 illustrate a coupling between the frame 14 and a ranging arm 26. In the illustrated embodiment, the coupling is a pin connection including a pin 92 (FIG. 7) extending along the arm axis 34. The pin 92 extends through frame lugs 96 coupled to the frame 14 and arm lugs 98 coupled to the arm 26. The pin connection permits the arm 26 to pivot about the arm axis 34 in a direction perpendicular to the mine face. Stated another way, the arm axis 34 is parallel to the plane of the frame 14 but is transverse to the directions 54, 58 (FIG. 2) of movement of the frame 14. The mining machine 10 further includes a sensor assembly 102 for detecting the rotation of the arm 26 relative to the frame 14 about the arm axis 34, as well as a support structure 106 for the sensor assembly 102.

Figure 7:
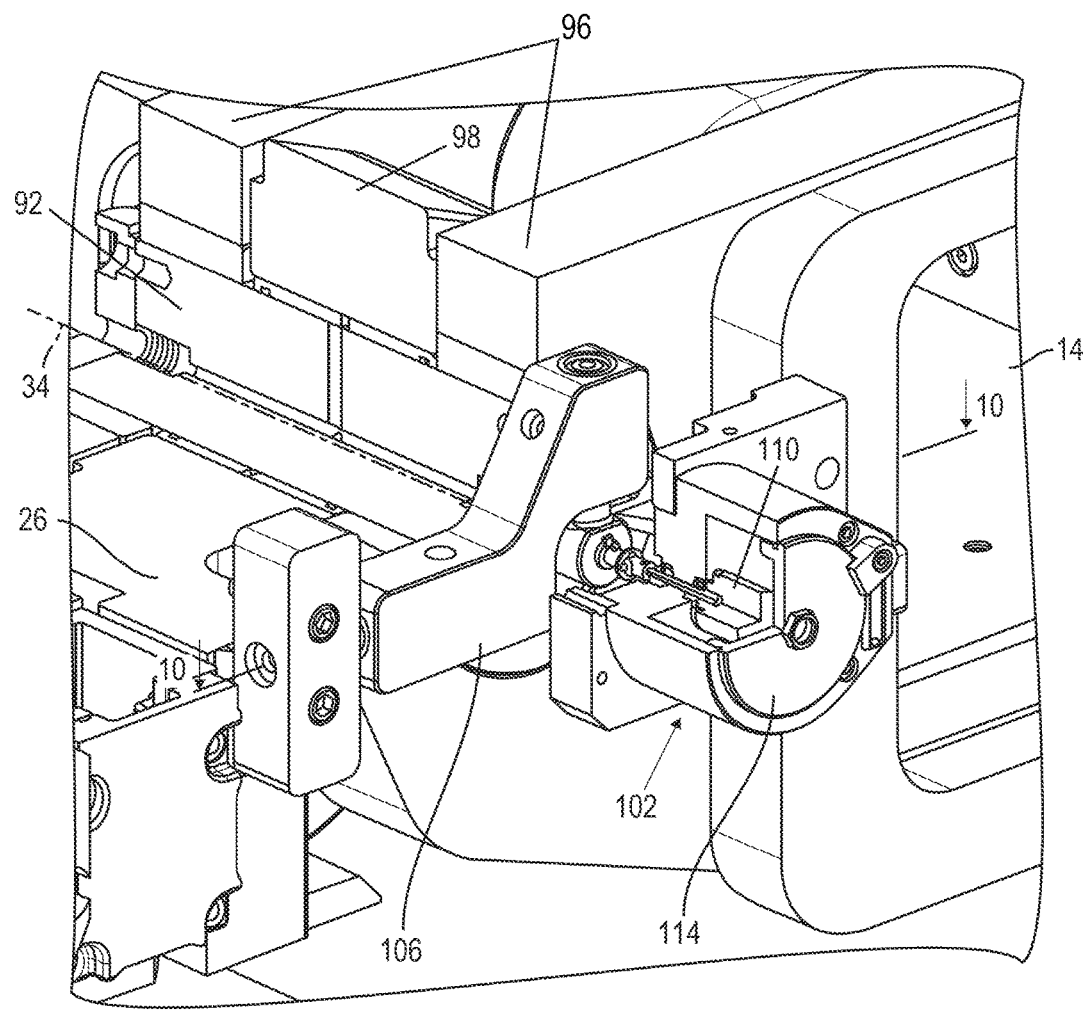
FIG. 7 is a perspective view of a sensor and sensor support structure positioned on a mining machine.
Figure 8:
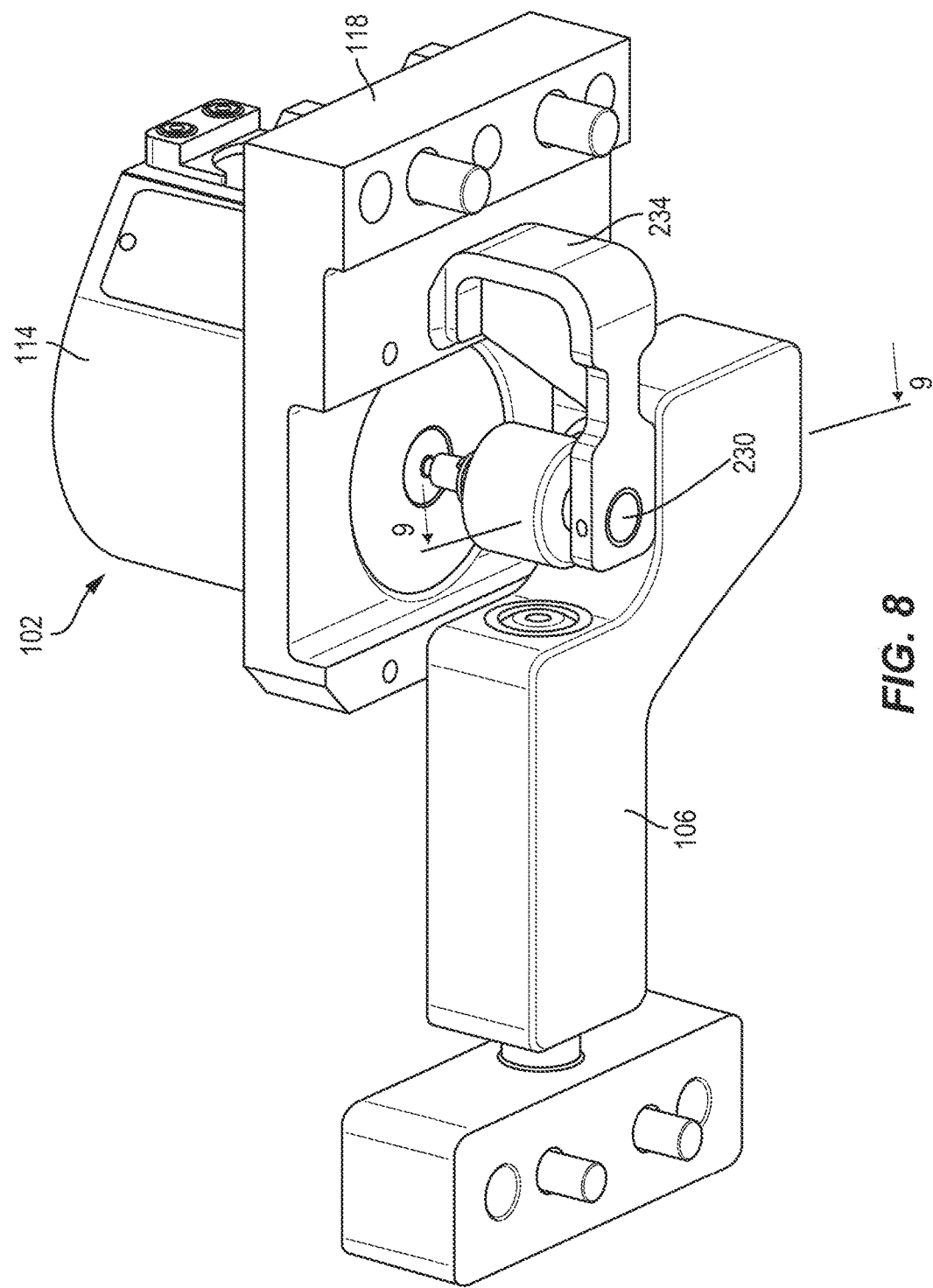
FIG. 8 is a perspective view of the sensor and the sensor support structure of FIG. 7.
Figure 9:
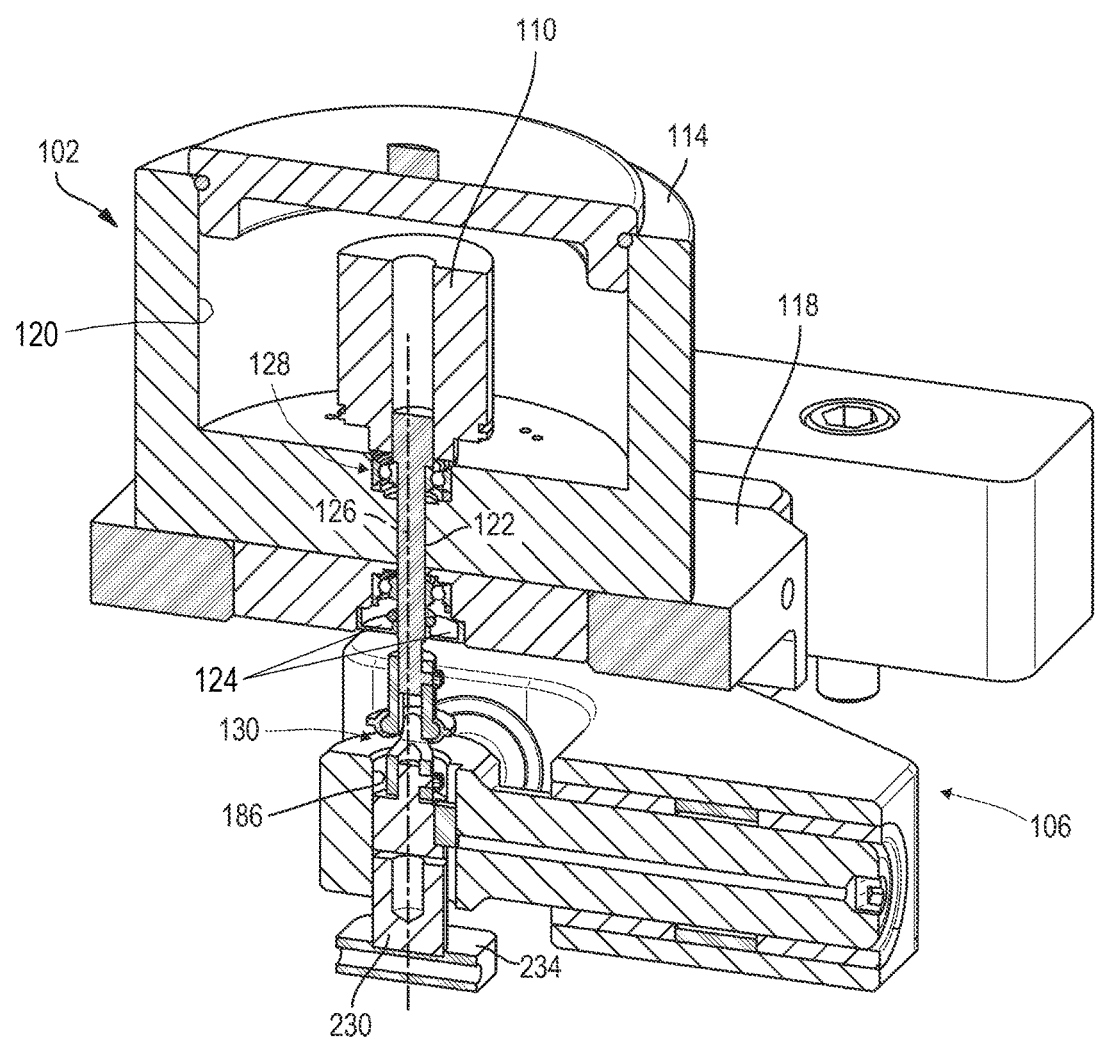
FIG. 9 is a cross-section view of the sensor and the sensor support structure of FIG. 8 viewed along section 9-9.
Figure 10:
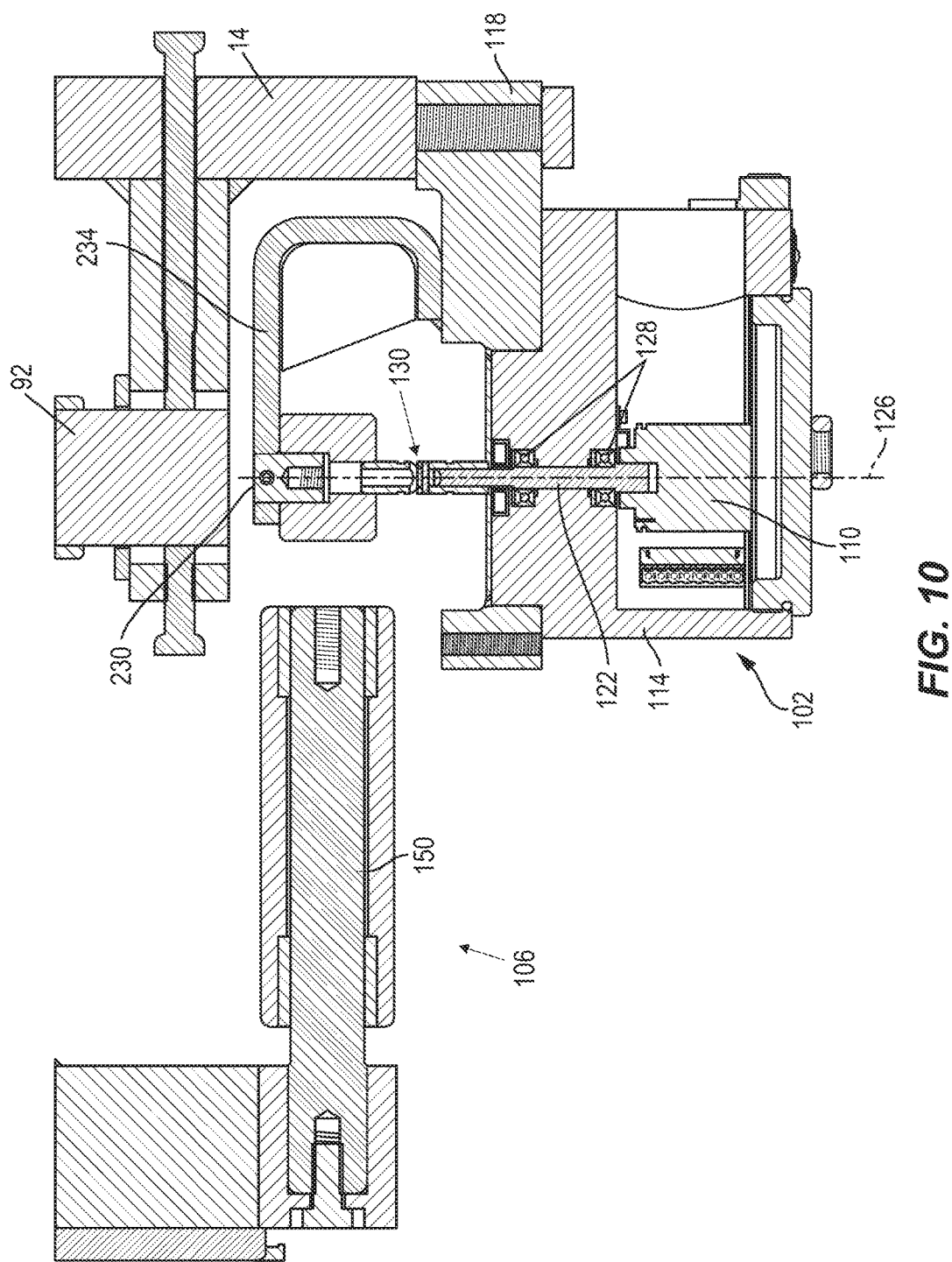
FIG. 10 is a cross-section view of the sensor and the sensor support structure of FIG. 7, viewed along section 10-10.

As shown in FIGS. 8-10, in the illustrated embodiment, the sensor assembly 102 includes a rotary encoder or rotor 110 (FIGS. 9 and 10) and a housing 114. The housing 114 is secured to a bracket 118, which in turn is secured to the frame 14 (FIG. 7). The housing 114 is therefore stationary relative to the frame 14. The rotor 110 is positioned within an interior chamber 120 (FIG. 9) of the housing 114 and is coupled to the support structure 106. The support structure 106 is coupled to the ranging arm 26 (FIG. 7). As the ranging arm 26 rotates, the rotor 110 rotates relative to the housing 114, and a reader (not shown) measures the angular displacement of the rotor 110 relative to the housing 114 about a rotor axis 126. In some embodiments, the reader may be optical and include a light source and a photo detector; in other embodiments, the reader may include a magnetic sensor or a capacitive sensor. Other aspects of rotary encoders are known to a person of ordinary skill in the art and are not discussed here in further detail.

As shown in FIGS. 9 and 10, the rotor 110 is coupled to a shaft 122 that extends out of the housing 114. The shaft 122 is supported for rotation relative to the housing 114 (e.g., by bearings 128). In some embodiments, the rotor 110 is rigidly coupled to the shaft 122. The shaft 122 extends along the rotor axis 126 (FIG. 9). One or more seals or boots 124 (FIG. 9) may be applied to the linking portions of the shaft 122 to prevent dirt or other materials from entering the sensor assembly 102 and contaminating its components. Additional seals (not shown) may be provided to prevent contaminants from entering the support structure 106. In some embodiments, the shaft 122 may be formed from stainless steel. The shaft 122 may also be preloaded or biased to prevent backlash or unwanted rotation.

Figure 11:
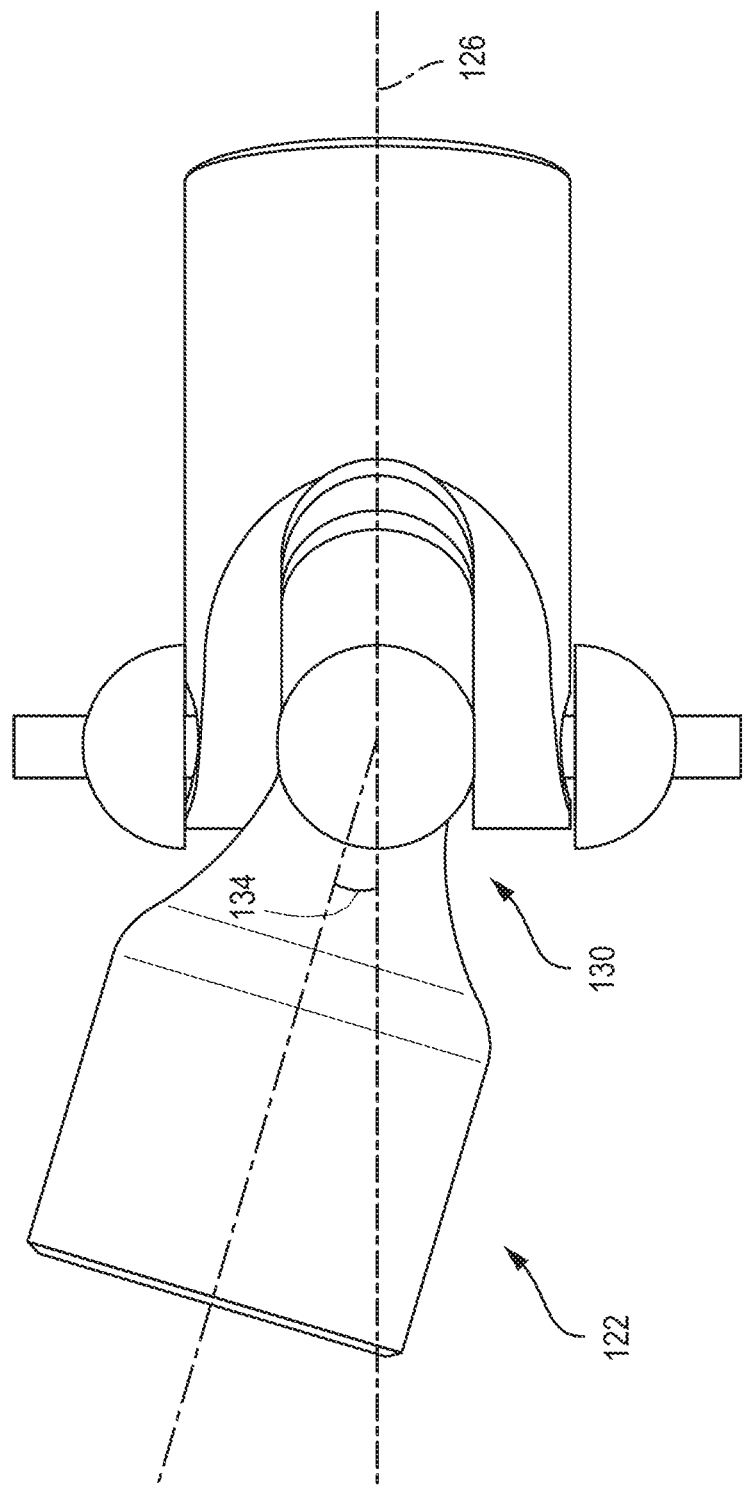
FIG. 11 is a side view of a portion of a shaft.

As shown in FIGS. 9-11, in the illustrated embodiment, the shaft 122 includes a universal joint or U-joint 130. The U-joint 130 permits one portion of the shaft 122 to bend relative to the other portion and relative to the rotor axis 126, while still transmitting rotation to the rotor 110. In some embodiments, the U-joint 130 permits an end of the shaft 122 distal from the rotor 110 to be oriented at an acute angle 134 with respect to the rotor axis 126, thereby permitting some angular misalignment with respect to the axis of rotation of the rotor 110. In some embodiments, the angle 134 is between approximately 0 degrees and approximately 20 degrees. In other embodiments, the shaft 122 may be formed without a U-joint such that the shaft 122 is a unitary member.

Figure 12:
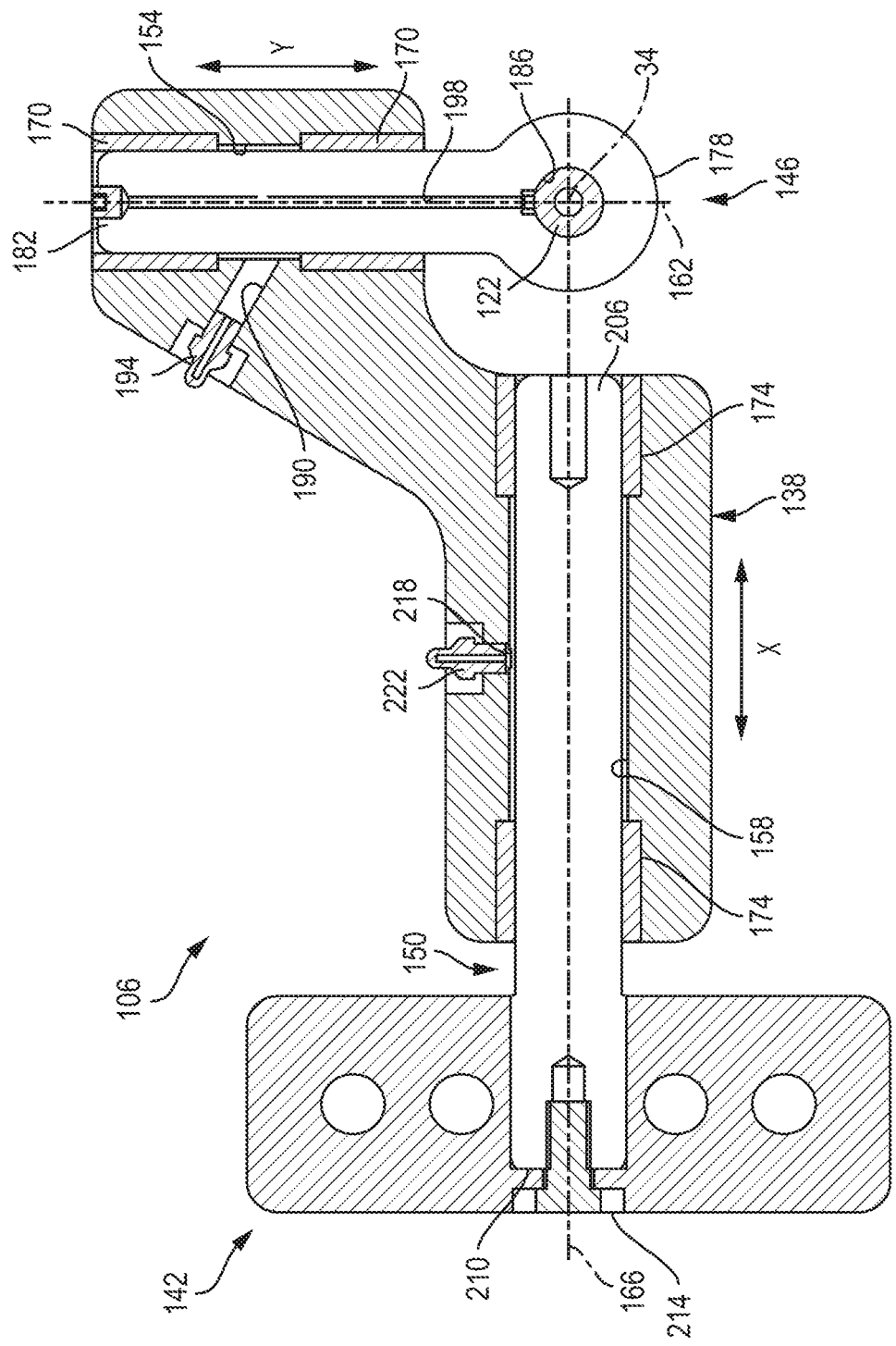
FIG. 12 is a cross-section view of the sensor support structure of FIG. 7.
Figure 13:
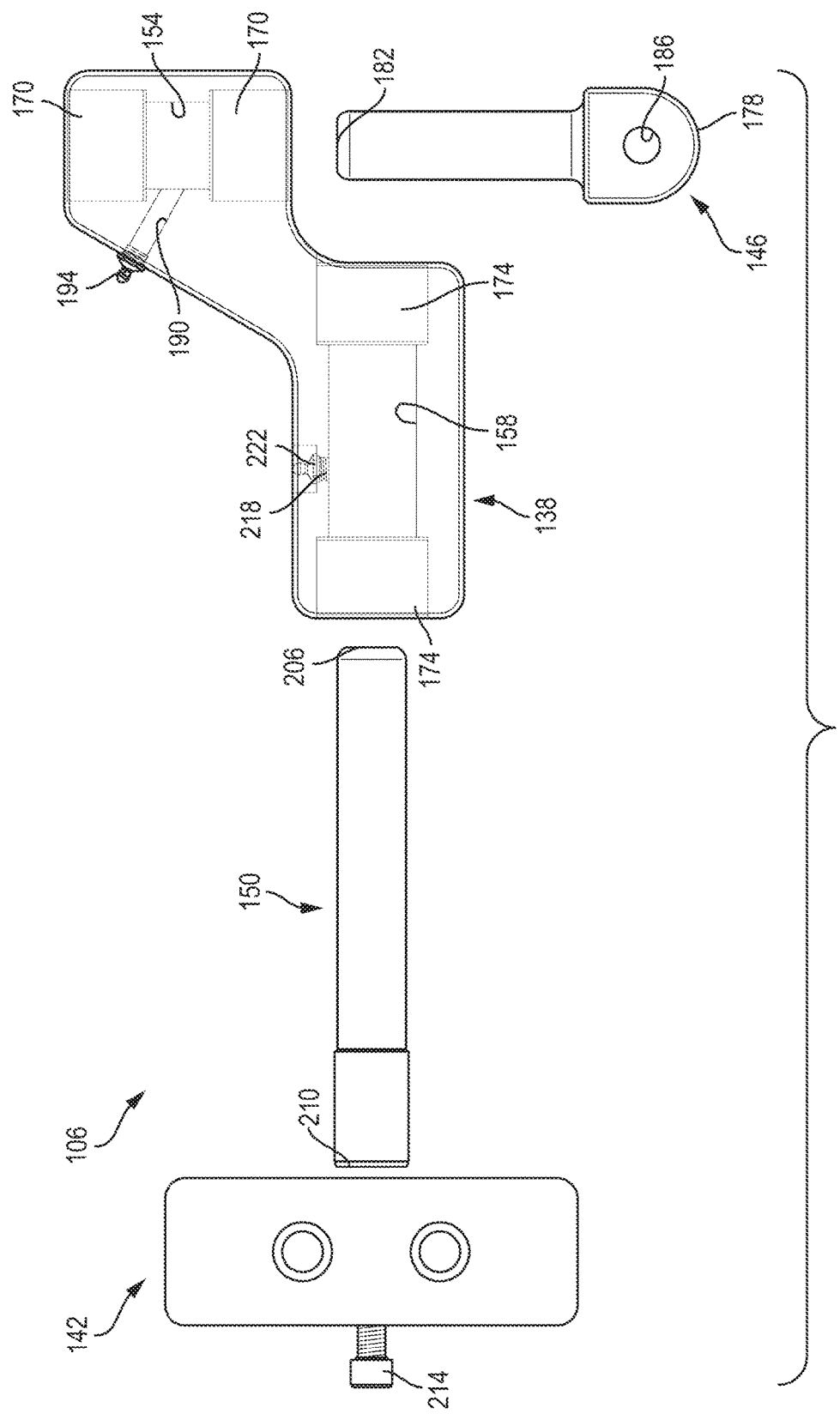
FIG. 13 is an exploded view of the sensor support structure of FIG. 12.

Referring now to FIGS. 12 and 13, the support structure 106 includes a first housing 138, a second housing 142, a first member 146, and a second member 150. In the illustrated embodiment, the second housing 142 is secured to the ranging arm 26 (FIG. 7) and pivots with the arm 26. The first housing 138 includes a first portion having a first bore 154 and second portion having a second bore 158. The first bore 154 defines a first axis 162 (FIG. 12) and the second bore 158 defines a second axis 166. In the illustrated embodiment, the first axis 162 and the second axis 166 are substantially coplanar, and the first axis 162 is oriented perpendicular relative to the second axis 166. In other embodiments, the first axis 162 and the second axis 166 may be oriented at another non-zero angle relative to one another. In some embodiments, the angle between the first axis 162 and the second axis 166 is at least 30 degrees. In some embodiments, the angle between the first axis 162 and the second axis 166 is at least 45 degrees. In some embodiments, the angle between the first axis 162 and the second axis 166 is at least 60 degrees. In some embodiments, the angle between the first axis 162 and the second axis 166 is greater than 90 degrees. The first housing 138 further includes a pair of first bushings 170 positioned in the first bore 154 and a pair of second bushings 174 positioned in the second bore 158. In one embodiment, the first bushings 170 and the second bushings 174 are formed from a Toughmet alloy.

The first member 146 is positioned at least partially within the first bore 154. The first bushings 170 engage the first member 146 and are capable of limited movement relative to the first bore 154, primarily along the first axis 162. In the illustrated embodiment, the first member 146 is a first rod including a first end 178 and a second end 182. The first end 178 includes an opening 186 for receiving an end of the shaft 122 (FIG. 9), and the second end 182 extends at least partially through the first bore 154. The opening 186 is positioned to be concentric with the arm axis 34 (FIG. 7) of the arm 26 relative to the frame 14.

In the illustrated embodiment, the first housing 138 further includes a first passage 190 in communication with the first bore 154. A lubricant (e.g., grease) may be introduced into the first bore 154 through the first passage 190. A first grease fitting or plug 194 may be inserted in the first passage 190 to cover the first passage 190. As shown in FIG. 12, the first member 146 may include an internal passageway 198 providing fluid communication between the first bore 154 and the opening 186 to provide lubricant to the shaft 122.

The second member 150 is positioned at least partially in the second bore 158. The second bushings 174 engage the second member 150 and are capable of movement relative to the second bore 158, primarily along the second axis 166. In the illustrated embodiment, the second member 150 is a second rod including a first end 206 and a second end 210. The first end 206 extends through at least a portion of the second bore 158, while the second end 210 is coupled to the second housing 142. The second end 210 of the second member 150 is secured to the second housing 142 by a fastener 214. The second member 150 connects the first housing 138 and the second housing 142.

In the illustrated embodiment, the first housing 138 further includes a second passage 218 in communication with the second bore 158. A lubricant (e.g., grease) may be introduced into the second bore 158 through the second passage 218. A second grease fitting or plug 222 may be inserted in the second passage 218 to cover the second passage 218.

Referring again to FIGS. 9 and 10, one end 230 of the shaft 122 extends through the first member 146 and is coupled to a web 234 secured to the bracket 118. The web 234 provides additional support against bending forces exerted on the shaft 122.

The support structure 106 positions the shaft 122 such that the rotor axis 126 is concentric with the arm axis 34 and transmits angular displacement/position to the rotor 110 while also permitting some radial misalignment. The support structure 106 allows for movement of the first member 146 relative to the first housing 138 along the first axis 162, thereby permitting some movement of the shaft 122 along the first axis 162 (i.e., parallel to the Y-direction labeled in FIG. 12). In addition, lateral movement of the shaft 122 may be transferred to the first member 146 and first housing 138, causing the first housing 138 to move relative to the second member 150 along the second axis 166 (i.e., parallel to the X-direction labeled in FIG. 12). As a result, the support structure 106 resolves movement of the shaft 122 into two linear directions.

The support structure 106 provides a high sensitivity to movement of the shaft 122. In some embodiments, the support structure 106 rotates with the arm 26 about the arm axis 34 between approximately 0 degrees and approximately 0.081 degrees before the shaft 122 begins to rotate. In other embodiments, the support structure 106 rotates with the arm 26 about the arm axis 34 between approximately 0 degrees and approximately 0.1 degrees before the shaft 122 begins to rotate.

Conventional encoder sensor supports have experienced errors due to shaft misalignment, which may be caused by wear on the shaft and/or bushings. In addition, excessive loading may cause the encoder shaft to break. In the support structure 106, the first member 146 and the second member 150 provide a take-up function, permitting the encoder shaft 122 to move in two linear directions oriented radially with respect to the arm axis 34. The ability to move in the radial directions allows for bushing wear in each direction and/or the combination of the two directions. In addition, this linear movement is accomplished without altering the angular position of the support structure 106 or the angular measurement that it transfers to the rotary encoder.

The sensor assembly 102 and support structure 106 have been described above with respect to a longwall shearer 10, but it is understood that the disclosed embodiments could be incorporated onto a different type of machine.

Although aspects have been described in detail with reference to certain preferred embodiments, variations and modifications exist within the scope and spirit of one or more independent aspects as described.

We claim:
1. A support structure for a rotary sensor including a rotor and a housing, the support structure comprising:
   a shaft including a first end, a second end, and a shaft axis extending therebetween, the first end configured to be coupled to the rotor, the shaft supported for rotation about the shaft axis;
   a housing portion including a first bore and a second bore, the first bore extending along a first axis, the second bore extending along a second axis oriented at a non-zero angle relative to the first axis;
a first member at least partially positioned in the first bore and movable relative to the housing portion in a direction parallel to the first axis, the first member coupled to the second end of the shaft; and
a second member at least partially positioned in the second bore, at least one of the housing portion and the second member is movable relative to the other of the housing portion and the second member in a direction parallel to the second axis.

2. The support structure of claim 1, wherein the first axis and the second axis are substantially coplanar and oriented perpendicular to one another.

3. The support structure of claim 1, wherein the housing portion is a first housing portion, the support structure further comprising a second housing portion, wherein an end of the second member is secured to the second housing portion.

4. The support structure of claim 1, wherein the shaft includes a universal joint positioned between the first end and the second end of the shaft, wherein the universal joint permits a portion of the shaft proximate the second end of the shaft to form an acute angle about the universal joint relative to a portion of the shaft proximate the first end of the shaft.

5. The support structure of claim 4, wherein the acute angle is between approximately 0 degrees and approximately 20 degrees.

6. The support structure of claim 1, wherein the shaft axis is oriented perpendicular to the first axis.

7. The support structure of claim 6, wherein the first axis and the second axis are substantially coplanar, wherein the shaft axis is oriented substantially perpendicular to both the first axis and the second axis.

8. The support structure of claim 1, further comprising at least one first bushing positioned in the first bore to support relative movement of the first member and the housing portion, and at least one second bushing positioned in the second bore to support relative movement of the second member and the housing portion.

9. A rotary sensor assembly comprising:
a sensor including a sensor housing and a rotor, the sensor housing having an interior chamber, the rotor positioned within the interior chamber and rotatable relative to the sensor housing about a rotor axis, the sensor detecting the angular position of the rotor relative to the sensor housing about the rotor axis;
a shaft including a first end and a second end, the first end coupled to the rotor, the shaft supported for rotation relative to the sensor housing about the rotor axis;
a support housing portion including a bore extending along a support axis; and
a member at least partially positioned in the bore, the member coupled to the second end of the shaft, the member movable relative to the support housing portion in a direction parallel to the support axis in response to deflection of the second end of the shaft relative to the rotor axis.

10. The rotary sensor assembly of claim 9, wherein the bore is a first bore, the spport axis is a first support axis, and the member is a first member, wherein the support housing portion further includes a second bore extending along a second support axis oriented at a non-zero angle relative to the first support axis, the sensor assembly further comprising a second member at least partially positioned in the second bore, at least one of the support housing portion and the second member is movable relative to the other of the support housing portion and the second member in a direction parallel to the second support axis and in response to deflection of the second end of the shaft away from the rotor axis.

11. The rotary sensor assembly of claim 10, wherein the first support axis and the second support axis are substantially coplanar and oriented perpendicular to one another.

12. The rotary sensor assembly of claim 10, wherein the support housing portion is a first support housing portion, the support structure further comprising a second support housing portion, wherein an end of the second member is secured to the second support housing portion.

13. The rotary sensor assembly of claim 12, wherein the acute angle is between approximately 0 degrees and approximately 20 degrees.

14. The rotary sensor assembly of claim 10, wherein the first support axis and the second support axis are substantially coplanar, wherein the rotor axis is oriented substantially perpendicular to both the first support axis and the second support axis.

15. The rotary sensor assembly of claim 9, wherein the shaft includes a universal joint positioned between the first end and the second end of the shaft, wherein the universal joint permits a portion of the shaft proximate the second end of the shaft to form an acute angle about the universal joint relative to a portion of the shaft proximate the first end of the shaft.

16. A mining machine comprising:
a chassis including a drive mechanism for moving the chassis relative to a mine surface;
at least one cutting assembly including an arm and a cutting mechanism, the arm pivotably coupled to the chassis and pivotable about an arm axis, the cutting mechanism supported for rotation on the arm and including a plurality of cutting bits for engaging a mine face;
a sensor assembly coupled to one of the chassis and the arm, the sensor assembly including a sensor housing and a rotor, the sensor housing having an interior chamber, the rotor positioned within the interior chamber and rotatable relative to the sensor housing about a rotor axis, the sensor assembly detecting angular displacement of the rotor relative to the sensor housing about the rotor axis when the arm pivots relative to the chassis about the arm axis;
a shaft including a first end and a second end, the first end coupled to the rotor, the shaft supported for rotation relative to the sensor housing about the rotor axis;
a support housing portion including a first bore and a second bore, the first bore extending along a first axis, the second bore extending along a second axis oriented at a non-zero angle relative to the first axis;
a first member at least partially positioned in the first bore, the first member coupled to the second end of the shaft, the first member movable relative to the support housing portion in a direction parallel to the first axis in response to deflection of the second end of the shaft away from the rotor axis; and
a second member coupled to the other of the chassis and the arm, the second member at least partially positioned in the second bore, at least one of the support housing portion and the second member is movable relative to the other of the support housing portion and the second member in a direction parallel to the second axis and in response to deflection of the second end of the shaft away from the rotor axis.

17. The mining machine of claim 16, wherein the first axis and the second axis are substantially coplanar and oriented perpendicular to one another.

18. The mining machine of claim 16, wherein the support housing portion is a first support housing portion, the support structure further comprising a second support housing portion, wherein an end of the second member is secured to the second support housing portion.

19. The mining machine of claim 16, wherein the shaft includes a universal joint positioned between the first end and the second end of the shaft, wherein the universal joint permits a portion of the shaft proximate the second end of the shaft to form an acute angle about the universal joint relative to a portion of the shaft proximate the first end of the shaft.

20. The mining machine of claim 19, wherein the acute angle is between approximately 0 degrees and approximately 20 degrees.

21. The mining machine of claim 16, wherein the first axis and the second axis are substantially coplanar, wherein the rotor axis is oriented substantially perpendicular to both the first axis and the second axis.

\* \* \* \* \*